(12) United States Patent
Chino et al.

(10) Patent No.: US 6,827,770 B2
(45) Date of Patent: Dec. 7, 2004

(54) METAL CHELATED DYESTUFF FOR INKJET RECORDING, AQUEOUS INKJET RECORDING LIQUID COMPRISING SAME AND INKJET RECORDING METHOD USING SAME

(75) Inventors: Tomohiro Chino, Kanagawa (JP); Masahiro Yamada, Kanagawa (JP); Hideo Sano, Kanagawa (JP); Wataru Shimizu, Kanagawa (JP); Yuukichi Murata, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 283 days.

(21) Appl. No.: 10/172,927

(22) Filed: Jun. 18, 2002

(65) Prior Publication Data

US 2003/0125530 A1 Jul. 3, 2003

(30) Foreign Application Priority Data

Jun. 19, 2001 (JP) .................................. P.2001-185245
Jun. 6, 2002 (JP) .................................. P.2002-165893

(51) Int. Cl.$^7$ .......................... C09D 11/02; C09B 45/14
(52) U.S. Cl. ................ 106/31.46; 106/31.48; 106/31.5; 534/653; 534/693; 534/703; 534/705; 534/707; 534/710; 534/711; 534/712
(58) Field of Search .......................... 106/31.46, 31.48, 106/31.5; 534/653, 693, 703, 705, 707, 710, 711, 712

(56) References Cited

U.S. PATENT DOCUMENTS

2003/0088077 A1 * 5/2003 Yamada et al. ............. 534/707

FOREIGN PATENT DOCUMENTS

| DE | 651 105 | 10/1937 |
|---|---|---|
| EP | 0482896 | * 4/1992 |
| EP | 0 902 064 | 3/1999 |
| JP | 48-89932 | 11/1973 |
| JP | 10-259331 | 9/1998 |
| WO | WO 01/48090 | 7/2001 |

* cited by examiner

Primary Examiner—Helene Klemanski
(74) Attorney, Agent, or Firm—Oblon, Spivak, McClelland, Maier & Neustadt, P.C.

(57) ABSTRACT

A metal chelated dyestuff for inkjet recording comprising a water soluble azo metal chelated compound formed by an azo-based compound represented by the following general formula (1) having one or more hydrophilic group per molecule and a metal element; an aqueous inkjet recording liquid comprising an aqueous medium and the aforementioned metal chelated dyestuff; and an inkjet recording method using the aforementioned recording liquid are described, (1)

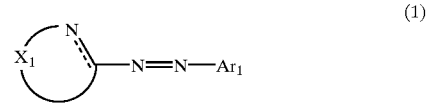

wherein the heterocyclic ring containing $X_1$ is a triazole ring or the like; and $Ar_1$ represents naphthyl group having a chelated group.

22 Claims, No Drawings

METAL CHELATED DYESTUFF FOR INKJET RECORDING, AQUEOUS INKJET RECORDING LIQUID COMPRISING SAME AND INKJET RECORDING METHOD USING SAME

FIELD OF THE INVENTION

The present invention relates to a water soluble dyestuff for inkjet recording, an aqueous inkjet recording liquid comprising the water soluble dyestuff and an inkjet recording method using the aqueous inkjet recording liquid. More particularly, the invention relates to a metal chelated dyestuff comprising a water soluble azo metal chelated compound suitable for inkjet recording, an aqueous inkjet recording liquid comprising the metal chelated dyestuff and an inkjet recording method using the aqueous inkjet recording liquid.

BACKGROUND OF THE INVENTION

A so-called inkjet recording method which allows droplets of a recording liquid containing water soluble dyes such as direct dye and acidic dye to be ejected from a minute ejection orifice to effect recording has been put to practical use.

The recording liquid requires that it be fixed rapidly on recording paper widely used for general official purposes such as PPC (plain paper COPIA) paper such as electrophotographic paper and fanhold paper (continuous paper for computer, etc.) and give a printed matter having a good print quality, i.e., print having a definite contour free of running. The recording liquid further requires that it exhibit an excellent storage stability as a recording liquid. Accordingly, the solvent which can be used in the recording liquid is remarkably limited.

Further, the dye for recording liquid requires that it have a sufficient solubility in the solvent thus restricted and remain stable even after prolonged storage in the form of recording liquid. The dye for recording liquid also requires that it give a printed image having high saturation and density and an excellent water resistance, light-fastness and indoor discoloration resistance.

In order to form a full-color image by an inkjet recording method, inks of three primary colors, i.e., yellow (Y), magenta (M) and cyan (C) or inks of four colors, including black (Bk) added thereto, are ejected onto a recording material in a controlled amount so that these inks are mixed to form an image. In order to form such a full-color image, it is necessary to express not only difference in color but also color density. The dark and light colored area is normally formed by two or more inks having different dyestuff concentrations.

However, the conventional inkjet recording dyestuffs are disadvantageous in that they are poor in resistance to discoloration under light, i.e., light-fastness, particularly on a light-colored area formed by an ink having a low dyestuff concentration.

In particular, as magenta dyestuffs to be incorporated in the recording liquid there have heretofore been used metal-free direct dyes (C.I. DR-227) or acidic dyes (C.I. AR-249), which are commercially available (The term "C.I." stands for "color index", the term "AR" stands for "acid red", and the term "DR" stands for "direct red".). However, the direct dyes have an unclear color tone. On the contrary, acidic dyes having a sharp color tone tend to have a deteriorated light-fastness. Further, the conventional metal-containing azo-based dyestuffs have a good light-fastness but have a blurred and unclear color tone.

Japanese Patent Laid-Open No. 1982-42775 discloses an aqueous ink for inkjet printing comprising at least one 5-hydroxypyrazole azo dye having an azo group in the 4-position or complex salt dye thereof with copper, nickel or cobalt. Japanese Patent Laid-Open No. 1998-259331 discloses an aqueous inkjet recording liquid comprising a water soluble complex formed by a benzene azo compound and at least one metal selected from nickel, cobalt, chromium and copper. Further, Japanese Patent Laid-Open No. 1999-140367 discloses an ink composition comprising a magenta dye ligand of 4-hydrox-3-(2'-pyridylazo)-1-(sulfo-substituted)-naphthalene having polyvalent metal ions coordinated therein and an ink vehicle.

However, these dyestuffs do not necessarily meet requirements for sharpness of color tone, light-fastness, indoor discoloration resistance, solubility, storage stability, etc. for use in inkjet recording.

Among the metals to be incorporated in the metal chelated compound, copper is cheaper than nickel, cobalt, etc. and is desired in safety. However, any of conventional metal chelated dyestuffs for inkjet recording comprising copper incorporated therein as a metal has left something to be desired in saturation.

SUMMARY OF THE INVENTION

An aim of the invention is to provide a metal chelated dyestuff for inkjet recording which provides a recorded image having a good print quality, a sharp color tone, a high density and an excellent light-fastness and showing little indoor discoloration even when subjected to inkjet recording on ordinary paper and exhibits a good dyestuff solubility and a good dyestuff stability after prolonged storage, an aqueous inkjet recording liquid comprising the metal chelated dyestuff and an inkjet recording method using the aqueous inkjet recording liquid.

Another aim of the invention is to provide a metal chelated dyestuff for inkjet recording sufficiently excellent in properties such as saturation, print density, light-fastness, indoor discoloration resistance and storage stability even when it comprises copper incorporated therein as a metal element, an aqueous inkjet recording liquid comprising the metal chelated dyestuff and an inkjet recording method using the metal chelated dyestuff.

The metal chelated dyestuff for inkjet recording of the invention is a water soluble azo metal chelated compound formed by an azo-based compound represented by the following general formula (1) having one or more hydrophilic group per molecule and a metal element.

The metal chelated dyestuff for inkjet recording of the invention is a water soluble azo metal chelated compound formed by an azo-based compound the free acid form of which is represented by the following general formula (1) and having one or more hydrophilic group per molecule and a metal element.

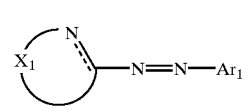

(1)

wherein $X_1$ represents a chain of a plurality of atoms containing a total of 2 or more hetero atoms of one or more kinds selected from the group consisting of nitrogen atom, oxygen atom and sulfur atom and required to form at least one 5- to 7-membered heterocyclic ring; the heterocyclic ring containing $X_1$ may have substituents thereon; the substituents on the heterocyclic ring may further be condensed to form a condensed ring; the condensed heterocyclic ring containing $X_1$ may be substituted, with the proviso that the heterocyclic ring containing $X_1$ is not a heterocyclic ring represented by the following general formula (2) or (3); and $Ar_1$ represents naphthyl group represented by any one of the following general formulae (4) to (6):

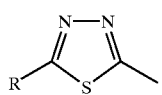

(2)

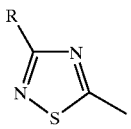

(3)

wherein R represents hydrogen atom or arbitrary substituent;

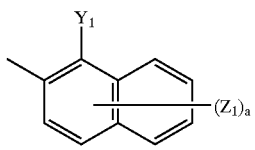

(4)

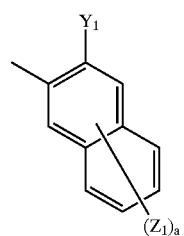

(5)

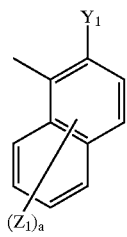

(6)

wherein $Y_1$ represents a chelating group; $Z_1$'s represent arbitrary substituents which may be different from each other; and a represents an integer of from 0 to 6.

The aqueous inkjet recording liquid of the invention comprises an aqueous medium and one or more metal chelated dyestuffs for inkjet recording of the invention.

The inkjet recording method of the invention involves the use of such an aqueous inkjet recording liquid of the invention.

In other words, the inventors found that a water soluble dyestuff comprising a water soluble azo metal chelated compound of the aforementioned azo-based compound or a compound the free acid form of which is the aforementioned azo-based compound with a metal element can accomplish the aforementioned aim and thus worked out the invention.

The reason why the metal chelated compound of specific azo-based compound represented by the aforementioned general formula (1) is comprehensively excellent in print density, light-fastness, indoor discoloration resistance, storage stability, etc. as an inkjet recording dyestuff is unknown. However, it is presumed that the connection of the specific skeleton of the azo-based compound to diazo group causes the formation of a stable chelate with a metal without deteriorating solubility, providing a high saturation dyestuff.

Further, the metal chelated dyestuff of the invention is sufficiently excellent in saturation, print density, light-fastness, indoor discoloration resistance, storage stability, etc. even when it comprises copper, which is inexpensive and preferable in safety, incorporated therein as a metal element, and thus has an extremely high industrial value.

DETAILED DESCRIPTION OF THE INVENTION

The invention will now be described in more detail below.

The metal chelated dyestuff for inkjet recording of the invention is a water soluble azo metal chelated compound formed by an azo-based compound represented by the general formula (1) having one or more hydrophilic groups per molecule or an azo-based compound the free acid form of which is represented by the general formula (1) and having one or more hydrophilic groups per molecule and a metal element.

In the general formula (1), $X_1$ represents a chain of a plurality of atoms containing a total of 2 or more hetero atoms of one or more kinds selected from the group consisting of nitrogen atom, oxygen atom and sulfur atom and required to form at least one 5- to 7-membered heterocyclic ring. The heterocyclic ring containing $X_1$ is preferably a heterocyclic ring having a nitrogen or oxygen atom at both ends of the carbon atom to which the azo group is connected to provide comprehensively excellent properties, including higher saturation, as an inkjet recording metal chelated dyestuff. Accordingly, in the atomic chain of $X_1$, the atom adjacent to the carbon atom to which the azo group is connected is preferably a nitrogen or oxygen atom. Particularly preferred examples of the heterocyclic ring containing $X_1$ include triazole ring, tetrazole ring, oxadiazole ring, and thiadiazole ring. Preferred among these heterocyclic rings is triazole ring.

The heterocyclic ring containing $X_1$ may have one or more substituents thereon. The substituents on the heterocyclic ring may be further condensed to form a condensed ring. In this case, the substituents on the heterocyclic ring each independently is one selected from the group consisting of alkyl group which may be substituted (e.g., alkyl group having from 1 to 6 carbon atoms such as methyl and ethyl, carboxymethyl group, carboxyethyl group, trifluoromethyl group), aryl group which may be substituted (preferably aryl group having from 6 to 10 carbon atoms such as phenyl and naphthyl), aralkyl group which may be substituted (preferably aralkyl group having from 7 to 10 carbon atoms such as benzyl), allyl group which may be substituted (preferably allyl group having from 3 to 9 carbon atoms such as vinyl and 2-propenyl), alkoxy group which may be substituted (preferably alkoxy group having from 1 to 6 carbon atoms such as methoxy and ethoxy), aryloxy group which may be substituted (e.g. phenoxy), acyloxy group which may be substituted (preferably alkanoyloxy group having from 2 to 7 carbon atoms such as acetyloxy, and benzoyloxy group, etc.), alkoxycarbonyl group which may be substituted (preferably alkoxycarbonyl group having from 2 to 7 carbon atoms such as methoxycarbonyl and ethoxycarbonyl), aryloxycarbonyl group which may be substituted (preferably phenoxycarbonyl group, naphthyloxy-carbonyl group, etc.), carbamoyl group which may be substituted, acyl group which may be substituted (preferably acyl group having from 2 to 10 carbon atoms such as acetyl), carboxyl group, hydroxyl group, cyano group, amino group which may be substituted (e.g., alkylamino group having from 1 to 8 carbon atoms such as methylamino, ethylamino, dimethylamino and diethylamino), acylamino group which may be substituted (alkanoylamino group having from 2 to 7 carbon atoms such as acetylamino, and benzoylamino group, etc.), nitro group, halogen atom (e.g., chlorine, bromine, fluorine), phosphono group, sulfo group, mercapto group, alkylthio group which may be substituted (alkylthio group having from 1 to 6 carbon atoms such as methylthio and ethylthio), alkylsulfoxy group which may be substituted (alkylsulfoxy group having from 1 to 6 carbon atoms such as methylsulfoxy and ethylsulfoxy), alkylsulfonyl group which may be substituted (alkylsulfonyl group having from 1 to 6 carbon atoms such as methylsulfonyl and ethylsulfonyl) and thiocyanato group.

In particular, the heterocyclic ring containing $X_1$ is preferably one represented by any one of the following general formulae (7) to (11).

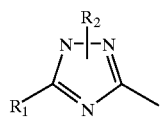
(7)

wherein $R_1$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group, hydroxyl group, acyl group which may be substituted, cyano group, amino group which may be substituted, acylamino group which may be substituted, nitro group, halogen atom, sulfo group, mercapto group, alkylthio group which may be substituted, alkylsulfoxy group which may be substituted, alkylsulfonyl group which may be substituted or thiocyanato group; $R_2$ represents hydrogen atom, alkyl group which may be substituted, aryl group which may be substituted or allyl group which may be substituted; and $R_1$ and $R_2$ may form a condensed ring together with a triazole ring.

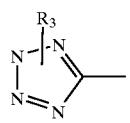
(8)

wherein $R_3$ represents hydrogen atom, alkyl group which may be substituted, aryl group which may be substituted, aralkyl group which may be substituted, alkoxycarbonyl group which may be substituted, aryloxycarbonyl group which may be substituted, carboxyl group, carbamoyl group, hydroxyl group, cyano group or sulfo group.

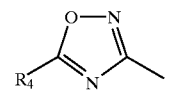
(9)

wherein $R_4$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

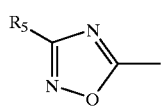
(10)

wherein $R_5$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

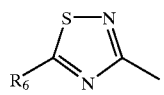
(11)

wherein $R_6$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

In the case where $R_1$ to $R_6$ in the general formulae (7) to (11) have substituents, examples of the substituents include alkyl or alkoxy group having not greater than 10 carbon atoms, preferably not greater than 6 carbon atoms, particularly from not smaller than 1 to not greater than 5 carbon atoms, carboxyl group, and cyano group. Preferred among these substituents are alkyl group, carboxyl group, and cyano group. Particularly preferred among these substituents are carboxyl group and cyano group because they can easily provide a metal chelated dyestuff for inkjet recording with higher saturation.

Preferred among the heterocyclic rings represented by the general formulae (7) to (11) is triazole ring represented by the general formula (7) because it can provide a metal chelated dyestuff with higher saturation.

Ar$_1$ in the general formula (1) is naphthyl group represented by any one of the following general formulae (4) to (6).

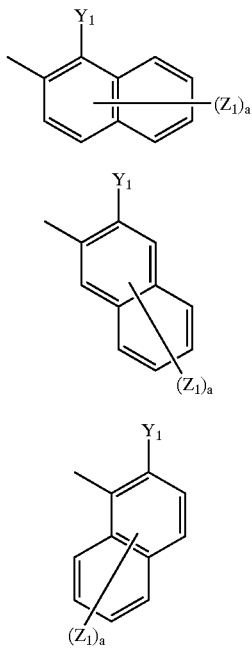

In the general formulae (4) to (6), Y$_1$ represents a chelating group, preferably hydroxyl group, carboxyl group, amino group which may be substituted (e.g., amino group, methylamino group, bis(2-hydroxyethyl)amino group), sulfo group, carbamoyl group, alkoxy group which may be substituted (preferably alkoxy group having from 1 to 6 carbon atoms such as methoxy, carbonyl and 2-hydroxyethoxy group), alkylthio group which may be substituted (preferably alkylthio group having from 1 to 6 carbon atoms such as methylthio and 2-hydroxyethylthio), alkylsulfonylamino group which may be substituted (preferably alkylsulfonylamino group having from 1 to 6 carbon atoms such as methylsulfonylamino) or arylsulfonylamino group which may be substituted (e.g., benzenesulfonylamino group) Preferred among the groups of Y$_1$ is hydroxyl group.

In the general formulae (4) to (6), Z$_1$'s each independently is preferably one selected from the group consisting of alkoxy group which may be substituted (alkoxy group having from 1 to 6 carbon atoms such as methoxy and ethoxy), aryloxy group which may be substituted (e.g., phenoxy group), acyloxy group which may be substituted (alkanoyloxy group having from 2 to 7 carbon atoms such as acetyloxy, and benzoyloxy group, etc.), alkoxycarbonyl group which may be substituted (alkoxycarbonyl group having from 2 to 7 carbon atoms such as methoxycarbonyl and ethoxycarbonyl), aryloxycarbonyl group which may be substituted (e.g., phenoxycarbonyl group, naphthyloxycarbonyl group), carboxyl group, carbamoyl group which may be substituted (e.g., carbamoyl group), carboxyanilide group which may be substituted (e.g., 3-sulfocarboxyanilide group), hydroxyl group, amino group which may be substituted (alkylamino group having from 1 to 6 carbon atoms such as amino and methylamino), ureide group, acylamino group which may be substituted (alkanoylamino group having from 2 to 7 carbon atoms such as acetylamino, and benzoylamino group, etc.), alkylsulfonylamino group which may be substituted (alkylsulfonylamino group having from 1 to 6 carbon atoms such as methylsulfonylamino), arylsulfonylamino group which may be substituted (e.g., phenylsulfonylamino group, 4-methylphenylsulfonyl-amino group), phosphono group, sulfo group and sulfamoyl group which may be substituted (e.g., sulfamoyl group, N,N-bis(carboxymethyl)sulfamoyl group). The suffix a represents an integer of from 0 to 6.

Z$_1$, if the carbon connected to the azo group is at the 1-position, is preferably connected to the carbon at the 3-position because it can easily provide a metal chelated dyestuff with higher saturation. Z$_1$ is also preferably a carboxyl group, carbamoyl group which may be substituted, sulfo group or sulfamoyl group which may be substituted. Preferred among these groups are sulfo group and sulfamoyl group which may be substituted because they can easily provide a metal chelated dyestuff with higher saturation.

Particularly preferred among the naphthyl groups Ar$_1$ represented by the general formulae (4) to (6) is α-naphthyl group represented by the general formula (6) because it can easily provide a metal chelated dyestuff with higher saturation.

The azo-based compound represented by the general formula (1) is a compound having at least one hydrophilic group per molecule. Examples of such a hydrophilic group include sulfo group, carboxyl group, hydroxyl group, amino group, and phosphono group. Preferred among these hydrophilic groups are sulfo group and carboxyl group.

In the invention, examples of the metal which forms a chelated compound with the azo-based compound represented by the general formula (1) include silver (I), aluminum (III), gold (III), cerium (III, IV), cobalt (II, III), chromium (III), copper (I, II), europium (III), iron (II, III), gallium (III), germanium (IV), indium (III), lanthanum (III), manganese (II), nickel (II), palladium (II), platinum (II, IV), rhodium (II, III), ruthenium (II, III, IV), scandium (III), silicon (IV), samarium (III), titanium (IV), uranium (IV), zinc (II), and zirconium (IV). Preferred among these metals are nickel (II), cobalt (II, III), copper (II), iron (II, III), and zinc (II). From the standpoint of price and environmental protection, copper (II) is more desirable.

Examples of the anion of metal salt to be used in the production of the chelated compound include monoviolent or divalent anions such as Cl$^-$, Br$^-$, CH$_3$COO$^-$ and SO$_4^{2-}$.

In the case where the hydrophilic group in the azo-based compound represented by the general formula (1) is an acid group as mentioned above, the metal chelated dyestuff of the invention may be used with its acid group kept in the form of free acid. In the case where the hydrophilic group in the azo-based compound has been produced in the form of salt, the metal chelated dyestuff of the invention may be used as it is or may be converted to a desired salt form before use. The acid group may be partly in the form of salt. A salt type dyestuff and a free acid type dyestuff may be present in admixture. Examples of such a salt include salt of alkaline metal such as Na, Li and K, ammonium salt which may be substituted by alkyl group or hydroxyalkyl group, and organic amine salt. Examples of the organic amine include lower alkylamine, hydroxy-substituted lower alkylamine, carboxy-substituted lower alkylamine, and polyamine having from 2 to 10 alkyleneimine units having from 2 to 4 carbon atoms. The number of the kinds of salt to be used is not limited to one. A plurality of salts may be present in admixture.

In the structure of the metal chelated dyestuff of the invention, if a plurality of acid groups are incorporated in its molecule, they may be in the form of either salt or acid or may be different from each other.

Specific examples of the metal chelated dyestuff of the invention include chelated dyestuffs of azo-based compounds formed by heterocyclic rings containing $X_1$ set forth in Tables 1 to 6 and $Ar_1$ set forth in Tables 7 and 8 in arbitrary combination with metal elements, e.g., nickel acetate or copper acetate, but the invention is not limited thereto.

TABLE 1

| No. | structure |
|---|---|
| 1-1 | (1,2,4-triazole, 3-methyl) |
| 1-2 | (HO₂C-substituted) |
| 1-3 | (F₃C-substituted) |
| 1-4 | (H₂NOC-substituted) |
| 1-5 | (Cl-substituted) |
| 1-6 | (Cl₂HC-substituted) |
| 1-7 | (ClH₂C-substituted) |
| 1-8 | (NC-substituted) |
| 1-9 | (OHC-substituted) |
| 1-10 | (H₃C-substituted) |

TABLE 1-continued

| No. | structure |
|---|---|
| 1-11 | (C₂H₅-substituted) |
| 1-12 | (C₆H₅-CH=CH-substituted) |
| 1-13 | (HO₂C-CH=CH-substituted) |
| 1-14 | (F₃C-, N-CH₃ substituted) |
| 1-15 | (F₃C-, N-CH₂CO₂H substituted) |
| 1-16 | (HO₂C-, N-CH₃ substituted) |

TABLE 2

| No. | structure |
|---|---|
| 1-17 | (phenyl-substituted) |
| 1-18 | (CH₃S-substituted) |
| 1-19 | (CH₃SO₂-substituted) |
| 1-20 | (CH₃SO-substituted) |

TABLE 2-continued
| No. | ![ring](X₁...N) |
|---|---|
| 1-21 | 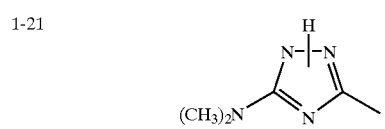 |
| 1-22 | 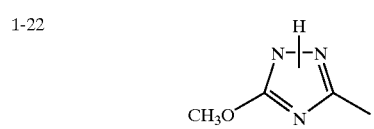 |
TABLE 3
| No. | ![ring](X₁...N) |
|---|---|
| 2-1 | 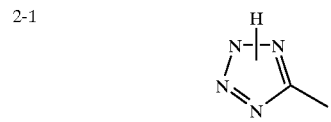 |
| 2-2 |  |
| 2-3 |  |
| 2-4 |  |
| 2-5 |  |
| 2-6 | 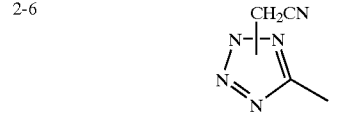 |
| 2-7 | 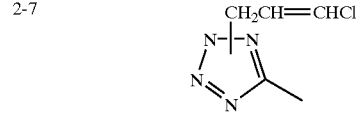 |
TABLE 4
| No. | ![ring](X₁...N) |
|---|---|
| 3-1 |  |
| 3-2 | 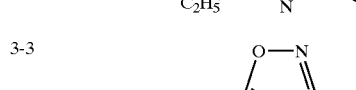 |
| 3-3 | 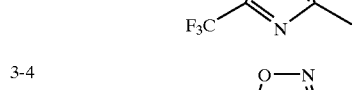 |
| 3-4 | 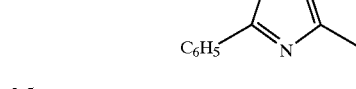 |
| 3-5 |  |
| 3-6 |  |
TABLE 5
| No. | ![ring](X₁...N) |
|---|---|
| 4-1 | 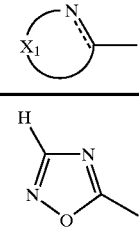 |
| 4-2 | 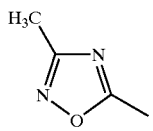 |
| 4-3 | 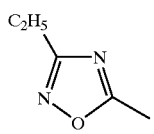 |
| 4-4 |  |
| 4-5 | 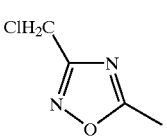 |

TABLE 5-continued
| No. | |
|---|---|
| 4-6 | 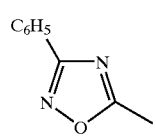 $C_6H_5$ |
TABLE 6
| No. | |
|---|---|
| 5-1 | 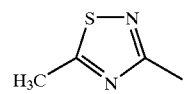 $H_3C$ |
| 5-2 | 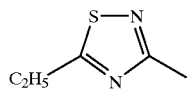 $C_2H_5$ |
| 5-3 | 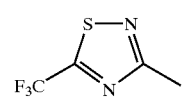 $F_3C$ |
| 5-4 | 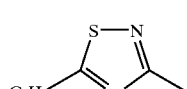 $C_6H_5$ |
| 5-5 | 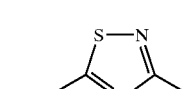 $ClH_2C$ |
| 5-6 | 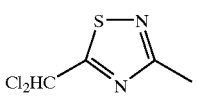 $Cl_2HC$ |
TABLE 7
| No. | $Ar_1$ |
|---|---|
| 6-1 | 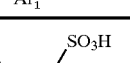 |
TABLE 7-continued
| No. | $Ar_1$ |
|---|---|
| 6-2 |  |
| 6-3 | 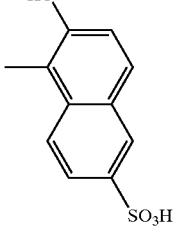 |
| 6-4 | 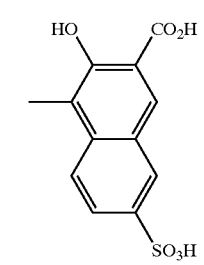 |
| 6-5 | 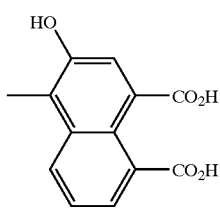 |
| 6-6 | 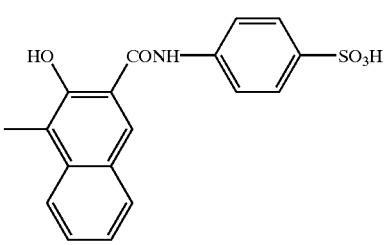 |
| 6-7 | 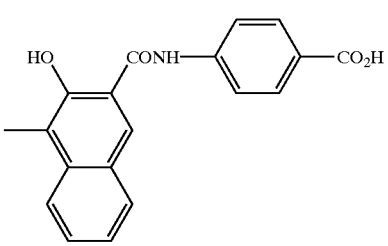 |

TABLE 7-continued

| No. | Ar₁ |
|---|---|
| 6-8 | (naphthalene with HO, CH₃, SO₂N(CH₂CO₂H)₂) |

TABLE 8

| No. | Ar₁ |
|---|---|
| 6-9 | (naphthalene with HO, ---, HO₃S) |
| 6-10 | (naphthalene with HO, CH₃, HO₃S, SO₃H) |
| 6-11 | (naphthalene with HO, CO₂H, CH₃, HO₃S) |
| 6-12 | (naphthalene with HO, CO₂H, CH₃) |

TABLE 8-continued

| No. | Ar₁ |
|---|---|
| 6-13 | (naphthalene with HO, CH₃, SO₂NHC₂H₄SO₃H) |
| 6-14 | (naphthalene with OH, CH₃, SO₃H) |
| 6-15 | (naphthalene with OH, CH₃, HO₃S, SO₃H) |
| 6-16 | (naphthalene with OH, OH, CH₃, HO₃S, SO₃H) |
| 6-17 | (naphthalene with OH, OC₂H₅, CH₃, HO₃S, SO₃H) |
| 6-18 | (naphthalene with OH, CH₃, HO₂C, CO₂H) |
| 6-19 | (naphthalene with OH, CH₃, HO₃S, NHCOCH₃) |

The azo metal chelated compound according to the invention can be produced from an azo-based compound represented by the general formula (1) or an azo-based compound the free acid form of which is represented by the general formula (1) and a metal compound.

The azo-based compound represented by the general formula (1) can be produced by any known method, e.g., by subjecting a heteroamine compound represented by the following general formula (in which $X_1$ is as defined in the general formula (1)) to diazotization according to diazotization coupling method to cause coupling with $H—Ar_1$ (in which $Ar_1$ is as defined in the general formula (1)).

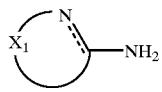

The azo-based compound thus obtained can be then reacted with a metal compound (e.g., $NiCl_2.6H_2O$, $CuCl_2.2H_2O$) to produce a water soluble azo metal chelated compound according to the invention.

In the water soluble azo metal chelated compound according to the invention, the number of azo-based compounds represented by the general formula (1) to be coordinated to the metal element as ligands varies with the azo-based compound and metal compound used. In practice, however, the number of azo-based compounds represented by the general formula (1) to be coordinated is from 1 to 2 per metal element. The molecular weight of the water soluble azo metal chelated compound is preferably not greater than 2,000, particularly from 500 to 1,500 as calculated in terms of molecular weight excluding that of metal element taking into account the solubility and storage stability for use in inkjet recording.

The aqueous inkjet recording liquid of the invention comprises an aqueous medium and one or more metal chelated dyestuffs for inkjet recording of the invention.

The content of the aforementioned metal chelated dyestuff in the aqueous inkjet recording liquid of the invention is preferably from 0.5% to 10% by weight, particularly from 2% to 5% by weight based on the total weight of the recording liquid as calculated in terms of water soluble azo metal chelated compound if the aqueous inkjet recording liquid is used as a dark color ink or preferably from 0.1% to 2% by weight, particularly from 0.1% to 1.5% by weight based on the total weight of the recording liquid as calculated in terms of water soluble azo metal chelated compound if the aqueous inkjet recording liquid is used as a light color ink.

As the aqueous medium to be used in the recording liquid of the invention there is preferably used a mixture of water and a water soluble organic solvent. Examples of the water soluble organic solvent to be mixed with water include ethylene glycol, propylene glycol, butylene glycol, diethylene glycol, triethylene glycol, polyethylene glycol (weight-average molecular weight: approx. 190 to 400), glycerin, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, and isopropanol. Such a water soluble organic solvent is normally used in an amount of from 1% to 45% by weight based on the total weight of the recording liquid. On the other hand, water is used in an amount of from 50% to 95% by weight based on the total weight of the recording liquid.

The recording liquid of the invention may comprise dyestuffs other than the metal chelated dyestuff of the invention and other additives incorporated therein.

The recording liquid of the invention may comprise a compound selected from the group consisting of urea, thiourea, biuret and semicarbazide incorporated therein in an amount of from about 0.1 to 10% by weight, preferably from about 0.5% to 5% by weight based on the total weight thereof or a surface active agent incorporated therein in an amount of from about 0.001% to 5% by weight based on the total weight thereof to further improve the quick-drying properties after printing and the print quality.

The pH value of the recording liquid of the invention is normally not lower than 4, preferably not lower than 6, more preferably not lower than 6.5, most preferably not lower than 7. The upper limit of the pH value of the recording liquid of the invention is normally not higher than 11, preferably not higher than 10, more preferably not higher than 9.5. In particular, the recording liquid is preferably within the range of from neutral to slightly alkaline to form a metal chelate of azo-based compound in a stable manner.

When the pH value of the recording liquid is too low beyond this range, i.e., falls below 4, the azo metal chelated compound of dyestuff exhibits a deteriorated dissolution stability to cause the precipitation of dyestuff during storage or dislocation of the metal chelate that can lead to discoloration. When the pH value of the recording liquid exceeds 11, the alcohol-based organic solvent and the metal chelate together form an alcholate in the recording liquid, possibly causing the deterioration of the ink properties. Further, the recording liquid of the invention can be brought into contact with the human body and thus is preferably prepared such that it is not provided with a high pH value from the standpoint of safety.

The pH value of the recording liquid can be adjusted with a pH adjustor. In this case, as the pH adjustor there may be used any material so far as it can control the pH value of the recording liquid to a desired range without having any adverse effects on the recording liquid to be prepared. Specific examples of the pH adjustor which is preferably used herein include hydroxides such as sodium hydroxide, potassium hydroxide, lithium hydroxide and ammonium hydroxide, inorganic acid salts of alkaline metal such as sodium carbonate, sodium hydrogencarbonate, potassium carbonate, lithium carbonate, sodium phosphate, potassium phosphate, lithium phosphate, potassium dihydrogenphosphate and disodium hydrogenphosphate, organic acid salts of alkaline metal such as sodium acetate, potassium acetate, lithium acetate, sodium oxalate, potassium oxalate, lithium oxalate, sodium borate, sodium tetraborate, potassium hydrogenphthalate and potassium hydrogentartrate, ammonia, amines such as methylamine, ethylamine, diethylamine, tris(hydroxymethyl)aminomethane hydrochloride, diethanolamine, triethanolamine, morpholine and propanolamine, 4-morpholine ethanesulfonate, and 4-morpholine propanesulfonate.

Preferred among these pH adjustors is a buffer having a buffering action. Examples of the buffer include a combination (mixture) of weak acid and salt thereof, or a combination (mixture) of weak base and salt thereof. Specific examples of the buffer include sodium acetate, lithium acetate, sodium phosphate, lithium phosphate, potassium dihydrogenphosphate, disodium hydrogenphosphate, sodium borate, sodium tetraborate, tris(hydroxymethyl) aminomethane hydrochloride, 4-morpholine ethanesulfonate, and 4-morpholine propanesulfonate. Preferred among these buffers are tris(hydroxymethyl) aminomethane hydrochloride, 4-morpholine ethanesulfonate, and 4-morpholine propanesulfonate.

The buffer is normally used in an amount of from 0.01% to 3% by weight, preferably from 0.1% to 1% by weight, more preferably from 0.1% to 0.5% by weight based on the total weight of the recording liquid.

Alternatively, the pH value of the recording liquid may be adjusted with a buffering solution. As such a buffering solution there may be normally used any buffering solution which is widely used for the purpose of inhibiting the drop of pH value caused by the incorporation of hydrogen ion, for example, systems comprising various materials incorporated therein in a proper amount in the form of the following combinations, etc. A proper buffering solution may be selected from these buffering solutions.

A combination of potassium hydrogenphthalate and sodium hydroxide,
a combination of potassium dihydrogenphosphate and sodium hydroxide,
a combination of boric acid, potassium chloride and sodium hydroxide,
a combination of glycine, sodium chloride and hydrochloric acid,
a combination of glycine, sodium chloride and sodium hydroxide,
a combination of sodium citrate and hydrochloric acid,
a combination of sodium citrate and sodium hydroxide,
a combination of sodium tetraborate (borax) and hydrochloric acid,
a combination of sodium tetraborate (borax) and sodium hydroxide,
a combination of potassium dihydrogenphosphate and disodium hydrogenphosphate,
a combination of potassium dihydrogencitrate and sodium hydroxide,
a combination of succinic acid and sodium tetraborate,
a combination of potassium dihydrogencitrate and sodium tetraborate,
a combination of potassium dihydrogenphosphate and sodium tetraborate,
a combination of sodium tetraborate and sodium carbonate,
a combination of hydrochloric acid and sodium carbonate,
a combination of tartaric acid and sodium tartrate,
a combination of lactic acid and sodium lactate,
a combination of acetic acid and sodium acetate,
a combination of ammonium chloride and ammonia,
a combination of sodium diethylbarbiturate, sodium acetate and hydrochloric acid,
a combination of sodium diethylbarbiturate and hydrochloric acid,
a combination of N,N-diethylglycine sodium salt and hydrochloric acid,
a combination of disodium hydrogenphosphate and citric acid,
a combination of citric acid, potassium dihydrogenphosphate, boric acid, diethylbarbituric acid and trisodium phosphate,
a combination of boric acid, citric acid and trisodium phosphate,
a combination of 2,4,6-trimethylpyridine and hydrochloric acid,
a combination of tris(hydroxymethyl)aminomethane and hydrochloric acid,
a combination of 2-amino-2-methyl-1,3-propanediol and hydrochloric acid,
a combination of 3-[4-(2-hydroxyethyl)-1-piperadinyl]-1-propanesulfonic acid, sodium hydroxide and sodium chloride, and
a combination of citric acid, potassium dihydrogenphosphate, sodium tetraborate, tris(hydroxymethyl)aminomethane, potassium chloride and sodium hydroxide Preferred among these buffering solutions are as follows.

A combination of potassium dihydrogenphosphate and sodium hydroxide,
a combination of boric acid, potassium chloride and sodium hydroxide,
a combination of sodium tetraborate (borax) and hydrochloric acid,
a combination of sodium tetraborate (borax) and sodium hydroxide,
a combination of potassium dihydrogenphosphate and disodium hydrogenphosphate,
a combination of potassium dihydrogenphosphate and sodium tetraborate,
a combination of ammonium chloride and ammonia, and
a combination of tris(hydroxymethyl)aminomethane and hydrochloric acid Particularly preferred among these buffers are as follows.

A combination of sodium tetraborate (borax) and sodium hydroxide and
a combination of tris(hydroxymethyl)aminomethane and hydrochloric acid The buffering solution is normally used in an amount of from 0.1% to 40% by weight, preferably from 0.5% to 30% by weight, more preferably from 1% to 25% by weight based on the total weight of the recording liquid.

In accordance with the inkjet recording method of the invention, droplets of such an aqueous inkjet recording liquid of the invention are ejected by an ordinary method to effect printing, making it possible to obtain a high quality printed matter.

The invention will be further described in the following synthesis examples and examples, but the invention is not limited thereto so far as it does not deviates from the scope thereof.

SYNTHESIS EXAMPLE 1

Synthesis of Azo-Based Compound by Diazotization Coupling Process

A solution obtained by adding 10.0 g of 3-amino-1,2,4-triazole to 82.7 g of a 40% sulfuric acid was cooled to a temperature of from 0° C. to 5° C. where 20.8 g of a 38% aqueous solution of sodium nitrite was then added thereto to cause diazotization.

Subsequently, to the solution was added sulfamic acid so that excess sodium sulfite was decomposed to obtain a diazo solution. Separately, 35.0 g of disodium 2-naphthol-3,6-disulfonate was dissolved in 400 ml of water. To the solution was then added 2.3 g of sulfamic acid. To the solution was then added dropwise the diazo solution previously mentioned at a temperature of from 0° C. to 5° C. while the pH value thereof was being adjusted with an aqueous solution of NaOH to a range of from 8.0 to 9.0. To the resulting slurry was then added 25 g of sodium chloride. The resulting solid content was withdrawn by filtration, and then washed with an aqueous solution of sodium chloride. The resulting solid content was then dissolved in 400 ml of water under heating to a temperature of 60° C. The solution was then allowed to cool to room temperature. To the solution was then added 400 ml of isopropanol. The resulting solid content was withdrawn by filtration, washed, and then dried to obtain 39.2 g of an azo dyestuff represented by the following structural formula (L1).

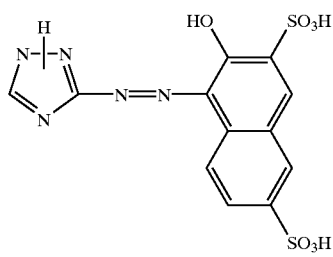

(L1)

SYNTHESIS EXAMPLE 2
Synthesis of Nickel Chelated Dyestuff

To 5.0 g of the azo dyestuff of the structural formula (L1) synthesized in Synthesis Example 1 was added 200 ml of water. The mixture was then adjusted to pH 10.0 with an aqueous solution of NaOH to make a solution. To the solution was then added dropwise a solution of 1.3 g of nickel acetate (II) tetrahydrate in 26 ml of water at a temperature of from 15° C. to 25° C. During the reaction, the pH value of the reaction solution was adjusted to a range of from 9.0 to 10.0. The dyestuff solution thus obtained was then desalted by a table electrodialysis device (Microacylizer S3, produced by Asahi Kasei Corp.). The residual aqueous solution was then concentrated. To the aqueous solution of dyestuff was then added isopropyl alcohol to produce a precipitate which was withdrawn by filtration, and then dried to obtain 3.5 g of a nickel chelated dyestuff.

The nickel chelated dyestuff (D-1) thus obtained exhibited a maximum absorption wavelength of 522 nm (in water).

SYNTHESIS EXAMPLE 3
Synthesis of Copper Chelated Dyestuff

To 5.0 g of the azo dyestuff of the structural formula (L1) synthesized in Synthesis Example 1 was added 200 ml of water. The mixture was then adjusted to pH 10.0 with an aqueous solution of NaOH to make a solution. To the solution was then added dropwise a solution of 2.1 g of copper acetate (II) monohydrate in 42 ml of water at a temperature of from 15° C. to 25° C. During the reaction, the pH value of the reaction solution was adjusted to a range of from 9.0 to 10.0. The dyestuff solution thus obtained was then desalted by a table electrodialysis device (Microacylizer S3, produced by Asahi Kasei Corp.). The residual aqueous solution was then concentrated. To the aqueous solution of dyestuff was then added isopropyl alcohol to produce a precipitate which was withdrawn by filtration, and then dried to obtain 3.5 g of a copper chelated dyestuff.

The copper chelated dyestuff (D-2) thus obtained exhibited a maximum absorption wavelength of 535 nm (in water).

SYNTHESIS EXAMPLE 4
Synthesis of Nickel Chelated Dyestuff

A dyestuff (L2) comprising No. 1-2 of Table 1 and No. 6-1 of Table 7 in combination was synthesized in the same manner as in Synthesis Example 1. The azo dyestuff (L2) thus obtained was then processed in the same manner as in Synthesis Example 2 to synthesize a nickel chelated dyestuff comprising the azo dyestuff (L2) and nickel acetate.

The nickel chelated dyestuff (D-3) thus obtained exhibited a maximum absorption wavelength of 533 nm (in water).

SYNTHESIS EXAMPLE 5
Synthesis of Copper Chelated Dyestuff

A dyestuff (L2) comprising No. 1-2 of Table 1 and No. 6-1 of Table 7 in combination was synthesized in the same manner as in Synthesis Example 1. The azo dyestuff (L2) thus obtained was then processed in the same manner as in Synthesis Example 3 to synthesize a copper chelated dyestuff comprising the azo dyestuff (L2) and copper acetate.

The copper chelated dyestuff (D-4) thus obtained exhibited a maximum absorption wavelength of 540 nm (in water).

SYNTHESIS EXAMPLE 6
Synthesis of Nickel Chelated Dyestuff

A dyestuff (L3) comprising No. 1-18 of Table 2 and No. 6-1 of Table 7 in combination was synthesized in the same manner as in Synthesis Example 1. The azo dyestuff (L3) thus obtained was then processed in the same manner as in Synthesis Example 2 to synthesize a nickel chelated dyestuff comprising the azo dyestuff (L3) and nickel acetate.

The nickel chelated dyestuff (D-5) thus obtained exhibited a maximum absorption wavelength of 515 nm (in water).

SYNTHESIS EXAMPLE 7
Synthesis of Copper Chelated Dyestuff

A dyestuff (L3) comprising No. 1-18 of Table 2 and No. 6-1 of Table 7 in combination was synthesized in the same manner as in Synthesis Example 1. The azo dyestuff (L3) thus obtained was then processed in the same manner as in Synthesis Example 3 to synthesize a copper chelated dyestuff comprising the azo dyestuff (L3) and copper acetate.

The copper chelated dyestuff (D-6) thus obtained exhibited a maximum absorption wavelength of 548 nm (in water).

SYNTHESIS EXAMPLE 8
Synthesis of Nickel Chelated Dyestuff

A dyestuff (L4) comprising No. 1-17 of Table 2 and No. 6-1 of Table 7 in combination was synthesized in the same manner as in Synthesis Example 1. The azo dyestuff (L4) thus obtained was then processed in the same manner as in Synthesis Example 2 to synthesize a nickel chelated dyestuff comprising the azo dyestuff (L4) and nickel acetate.

The nickel chelated dyestuff (D-7) thus obtained exhibited a maximum absorption wavelength of 516 nm (in water).

SYNTHESIS EXAMPLE 9
Synthesis of Copper Chelated Dyestuff

A dyestuff (L4) comprising No. 1-17 of Table 2 and No. 6-1 of Table 7 in combination was synthesized in the same manner as in Synthesis Example 1. The azo dyestuff (L4) thus obtained was then processed in the same manner as in Synthesis Example 3 to synthesize a copper chelated dyestuff comprising the azo dyestuff (L4) and copper acetate.

The copper chelated dyestuff (D-8) thus obtained exhibited a maximum absorption wavelength of 554 nm (in water).

SYNTHESIS EXAMPLE 10
Synthesis of Nickel Chelated Dyestuff

A dyestuff (L5) comprising No. 1-19 of Table 2 and No. 6-1 of Table 7 in combination was synthesized in the same manner as in Synthesis Example 1. The azo dyestuff (L5) thus obtained was then processed in the same manner as in Synthesis Example 2 to synthesize a nickel chelated dyestuff comprising the azo dyestuff (L5) and nickel acetate.

The nickel chelated dyestuff (D-9) thus obtained exhibited a maximum absorption wavelength of 535 nm (in water).

SYNTHESIS EXAMPLE 11

Synthesis of Copper Chelated Dyestuff

A dyestuff (L5) comprising No. 1-19 of Table 2 and No. 6-1 of Table 7 in combination was synthesized in the same manner as in Synthesis Example 1. The azo dyestuff (L5) thus obtained was then processed in the same manner as in Synthesis Example 3 to synthesize a copper chelated dyestuff comprising the azo dyestuff (L5) and copper acetate.

The copper chelated dyestuff (D-10) thus obtained exhibited a maximum absorption wavelength of 543 nm (in water).

EXAMPLE 1

To 10 parts by weight of diethylene glycol, 3 parts by weight of diethylene glycol monobutyl ether and 3.0 parts by weight of the nickel chelated dyestuff (D-1) obtained in Synthesis Example 2 was added water. The aqueous solution was then adjusted with an aqueous solution of sodium hydroxide to pH 9 to make 100 parts by weight. The composition was then thoroughly stirred for dissolution. The solution was filtered through a teflon (trade name) filter having a pore diameter of 1 μm under pressure, and then subjected to deaeration by a vacuum pump and an ultrasonic cleaner to prepare a recording liquid.

Using an inkjet printer (trade name "PM-750C", produced by SEIKO EPSON CORPORATION), the recording liquid thus obtained was subjected to inkjet recording on an electrophotographic paper (trade name "4024 paper", produced by Xerox Corp.), a superfine dedicated paper (trade name "MJA4SP1", produced by SEIKO EPSON CORPORATION), a superfine dedicated glossy paper (trade name "MJA4SP3", produced by SEIKO EPSON CORPORATION) and a dedicated photoprint paper (trade name "PMA4SP1", produced by SEIKO EPSON CORPORATION). As a result, a sharp bluish magenta-colored printed matter.

The printed matter and the recording liquid thus obtained were then subjected to the following tests. The results are set forth in Table 9.

<Light-Fastness Test>

Using a xenon fadeometer (produced by Atlas Co., Ltd.), the printed matter was irradiated with light for 80 hours, and then observed for discoloration.

<Indoor Discoloration Test>

The printed matter was observed for discoloration after 2 hours of storage in an optically-shielded tank having an ozone concentration of 3 ppm.

<Print Quality Test>

The printed matter was measured for saturation by means of Gretag Macbeth SPM50 (produced by Gretag Macbeth Corp.). All the printed matters were confirmed to have a high saturation.

<Test on Storage Stability of Recording Liquid>

The recording liquid was examined for change after 1 month of storage at a temperature of 5° C. and 60° C. in a sealed polytetrafluoroethylene container.

EXAMPLES 2 TO 6

Recording liquids were prepared in the same manner as in Example 1 except that as dyestuffs there were used chelated dyestuffs set forth in Table 9, respectively. The recording liquids thus prepared were each subjected to printing in the same manner as in Example 1. All the recording liquids provided a sharp magenta-colored printed matter.

The printed matters and the recording liquids thus obtained were then subjected to various tests in the same manner as in Example 1. The results are set forth in Table 9.

Comparative Example 1

A recording liquid was prepared in the same manner as in Example 1 except that the nickel chelated dyestuff (D-1) obtained in Synthesis Example 2 was replaced by the dyestuff of Example 1 in Japanese Patent Application No. 2000-390195 (corresponding to Japanese Patent Laid-Open No. 2002-80765). The recording liquid thus prepared was subjected to printing in the same manner as in Example 1. As a result, the recording liquid provided a sharp magenta-colored printed matter.

The printed matter and the recording liquid thus obtained were then subjected to various tests in the same manner as in Example 1. The results are set forth in Table 9.

Comparative Example 2

A recording liquid was prepared in the same manner as in Example 1 except that the nickel chelated dyestuff (D-1) obtained in Synthesis Example 2 was replaced by the dyestuff of Example 2 in Japanese Patent Application No. 2000-390195 (corresponding to Japanese Patent Laid-Open No. 2002-80765). The recording liquid thus prepared was subjected to printing in the same manner as in Example 1. As a result, the recording liquid provided a sharp magenta-colored printed matter.

The printed matter and the recording liquid thus obtained were then subjected to various tests in the same manner as in Example 1. The results are set forth in Table 9.

TABLE 9

| | | Example Nos. | | | | | | Comparative Example Nos. | |
| | | | | | | | | 1 | 2 |
| | | | | | | | | Dyestuff of Example 1 | Dyestuff of Example 2 |
| | | 1 | 2 | 3 | 4 | 5 | 6 | | |
| Chelated dyestuff of recording liquid | | Nickel chelated dyestuff (D-1) | Copper chelated dyestuff (D-2) | Nickel chelated dyestuff (D-3) | Copper chelated dyestuff (D-4) | Nickel chelated dyestuff (D-5) | Copper chelated dyestuff (D-6) | in Japanese Patent Application No. 2000-390195 | in Japanese Patent Application No. 2000-390195 |
| Light-fastness test | Electrophotographic paper | Small discoloration | Small discoloration | Small discoloration | Small discoloration | Small discoloration | Small discoloration | Small discoloration | Small discoloration |
| | Superfine | Small | Small | Small | Small | Small | Small | Small | Small |

TABLE 9-continued

| Chelated dyestuff of recording liquid | | Example Nos. | | | | | | Comparative Example Nos. | |
|---|---|---|---|---|---|---|---|---|---|
| | | 1 Nickel chelated dyestuff (D-1) | 2 Copper chelated dyestuff (D-2) | 3 Nickel chelated dyestuff (D-3) | 4 Copper chelated dyestuff (D-4) | 5 Nickel chelated dyestuff (D-5) | 6 Copper chelated dyestuff (D-6) | 1 Dyestuff of Example 1 in Japanese Patent Application No. 2000-390195 | 2 Dyestuff of Example 2 in Japanese Patent Application No. 2000-390195 |
| Indoor discoloration test | dedicated paper | discoloration | discoloration | discoloration | discoloration | discoloration | discoloration | discoloration | discoloration |
| | Superfine dedicated glossy paper | Small discoloration | Small discoloration | Small discoloration | Small discoloration | Small discoloration | Small discoloration | Small discoloration | Small discoloration |
| | Dedicated photoprint paper | Small discoloration | Small discoloration | Small discoloration | Small discoloration | Small discoloration | Small discoloration | Small discoloration | Small discoloration |
| | Electrophotographic paper | Small discoloration | Small discoloration | Small discoloration | Small discoloration | Small discoloration | Small discoloration | Small discoloration | Small discoloration |
| | Superfine dedicated paper | Small discoloration | Small discoloration | Small discoloration | Small discoloration | Small discoloration | Small discoloration | Great discoloration | Great discoloration |
| | Superfine dedicated glossy paper | Small discoloration | Small discoloration | Small discoloration | Small discoloration | Small discoloration | Small discoloration | Medium discoloration | Medium discoloration |
| | Dedicated photoprint paper | Small discoloration | Small discoloration | Small discoloration | Small discoloration | Small discoloration | Small discoloration | Great discoloration | Great discoloration |
| Test on storage stability of recording liquid | | No precipitation of insoluble matters at any temperature, good storage stability | No precipitation of insoluble matters at any temperature, good storage stability | No precipitation of insoluble matters at any temperature, good storage stability | No precipitation of insoluble matters at any temperature, good storage stability | No precipitation of insoluble matters at any temperature, good storage stability | No precipitation of insoluble matters at any temperature, good storage stability | No precipitation of insoluble matters at any temperature, good storage stability | No precipitation of insoluble matters at any temperature, good storage stability |

The metal chelated dyestuff for inkjet recording of the invention exhibits an excellent water solubility. The recording liquid of the invention comprising the metal chelated dyestuff can provide a sharp recorded matter when printed on ordinary paper and dedicated paper as an aqueous inkjet recording liquid. The recorded matter exhibits an excellent print density, light-fastness and indoor discoloration resistance. The recording liquid of the invention exhibits a good storage stability.

In accordance with the inkjet recording method of the invention, the use of the recording liquid of the invention makes it possible to obtain a high quality printed matter.

While the invention has been described in detail and with reference to specific embodiments thereof, it will be apparent to one skilled in the art that various changes and modifications can be made therein without departing from the spirit and scope thereof.

This application is based on Japanese patent applications No. 2001-185245 filed on Jun. 19, 2001, and No. 2002-165893 filed on Jun. 6, 2002, the entire contents thereof being hereby incorporated by reference.

What is claimed is:

1. A metal chelated dyestuff for inkjet recording which is a water soluble azo metal chelated compound formed by an azo-based compound represented by the following general formula (1) having one or more hydrophilic group per molecule and a metal element:

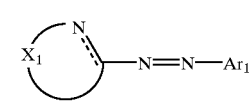

(1)

wherein $X_1$ represents a chain of a plurality of atoms containing a total of 2 or more hetero atoms of one or more kinds selected from the group consisting of nitrogen atom, oxygen atom and sulfur atom and required to form at least one 5- to 7-membered heterocyclic ring; the heterocyclic ring containing $X_1$ may have substituents thereon; the substituents on the heterocyclic ring may further be condensed to form a condensed ring; the condensed heterocyclic ring containing $X_1$ may be substituted, with the proviso that the heterocyclic ring containing $X_1$ is not a heterocyclic ring represented by the following general formula (2) or (3); and $Ar_1$ represents naphthyl group represented by any one of the following general formulae (4) to (6):

(2)

[Structure of 1,3,4-thiadiazole with R and methyl substituents]

(3)

[Structure of 1,3,4-thiadiazole isomer with R and methyl substituents]

wherein R represents hydrogen atom or arbitrary substituent;

(4)

[Naphthyl structure with $Y_1$ and $(Z_1)_a$ substituents]

(5)

[Naphthyl structure with $Y_1$ and $(Z_1)_a$ substituents]

(6)

[Naphthyl structure with $Y_1$ and $(Z_1)_a$ substituents]

wherein $Y_1$ represents a chelating group; $Z_1$'s represent arbitrary substituents which may be different from each other; and a represents an integer of from 0 to 6.

2. A metal chelated dyestuff for inkjet recording which is a water soluble azo metal chelated compound formed by an azo-based compound the free acid form of which is represented by the following general formula (1) and having one or more hydrophilic group per molecule and a metal element:

(1)

[Structure showing $X_1$ ring with N, connected via $-N=N-Ar_1$]

wherein $X_1$ represents a chain of a plurality of atoms containing a total of 2 or more hetero atoms of one or more kinds selected from the group consisting of nitrogen atom, oxygen atom and sulfur atom and required to form at least one 5- to 7-membered heterocyclic ring; the heterocyclic ring containing $X_1$ may have substituents thereon; the substituents on the heterocyclic ring may further be condensed to form a condensed ring; the condensed heterocyclic ring containing $X_1$ may be substituted, with the proviso that the heterocyclic ring containing $X_1$ is not a heterocyclic ring represented by the following general formula (2) or (3); and $Ar_1$ represents naphthyl group represented by any one of the following general formulae (4) to (6):

(2)

[Structure of 1,3,4-thiadiazole with R and methyl substituents]

(3)

[Structure of 1,3,4-thiadiazole isomer with R and methyl substituents]

wherein R represents hydrogen atom or arbitrary substituent;

(4)

[Naphthyl structure with $Y_1$ and $(Z_1)_a$ substituents]

(5)

[Naphthyl structure with $Y_1$ and $(Z_1)_a$ substituents]

(6)

[Naphthyl structure with $Y_1$ and $(Z_1)_a$ substituents]

wherein $Y_1$ represents a chelating group; $Z_1$'s represent arbitrary substituents which may be different from each other; and a represents an integer of from 0 to 6.

3. A metal chelated dyestuff for inkjet recording as defined in claim 1 or 2, wherein in the atom chain of $X_1$ in the general formula (1) the atom adjacent to the carbon to which the azo group is connected is a nitrogen atom or oxygen atom.

4. A metal chelated dyestuff for inkjet recording as defined in claim 1 or 2, wherein in the general formula (1), the heterocyclic ring containing $X_1$ is one selected from the group consisting of triazole ring, tetrazole ring, oxadiazole ring and thiadiazole ring which may have substituents.

5. A metal chelated dyestuff for inkjet recording as defined in claim 1 or 2, wherein in the general formula (1), the heterocyclic ring containing $X_1$ has one or more substituents and the substituents on the heterocyclic ring each independently is a group selected from the group consisting of alkyl group which may be substituted, aryl group which may be substituted, aralkyl group which may be substituted, allyl group which may be substituted, alkoxy group which may be substituted, aryloxy group which may be substituted, acyloxy group which may be substituted, alkoxycarbonyl group which may be substituted, aryloxycarbonyl group which may be substituted, carbamoyl group which may be substituted, acyl group which may be substituted, carboxyl group, hydroxyl group, cyano group, amino group which may be substituted, acylamino group which may be substituted, nitro group, halogen atom, phosphono group, sulfo group, mercapto group, alkylthio group which may be substituted, alkylsulfoxy group which may be substituted, alkylsulfonyl group which may be substituted and thiocyanato group.

6. A metal chelated dyestuff for inkjet recording as defined in claim 1 or 2, wherein in the general formulae (4) to (6), $Y_1$ is a hydroxyl group, carboxyl group, amino group which may be substituted, sulfo group, carbamoyl group, alkoxy group which may be substituted, alkylthio group which may be substituted, alkylsulfonylamino group which may be substituted or arylsulfonylamino group which may be substituted.

7. A metal chelated dyestuff for inkjet recording as defined in claim 6, wherein in the general formulae (4) to (6), $Y_1$ is hydroxyl group, alkoxy group which may be substituted or amino group which may be substituted.

8. A metal chelated dyestuff for inkjet recording as defined in claim 1 or 2, wherein in the general formulae (4) to (6), $Z_1$'s each independently is a group selected from the group consisting of alkoxy group which may be substituted, aryloxy group which may be substituted, acyloxy group which may be substituted, alkoxycarbonyl group which may be substituted, aryloxycarbonyl group which may be substituted, carboxyl group, carbamoyl group which may be substituted, carboxyanilide group which may be substituted, hydroxyl group, amino group which may be substituted, ureide group, acylamino group which may be substituted, alkylsulfonylamino group which may be substituted, arylsulfonylamino group which may be substituted, phosphono group, sulfo group and sulfamoyl group which may be substituted.

9. A metal chelated dyestuff for inkjet recording as defined in claim 1 or 2, wherein in the general formula (1), $Ar_1$ is represented by the general formula (6).

10. A metal chelated dyestuff for inkjet recording as defined in claim 9, wherein in the general formula (6), if the carbon connected to the azo group is at the 1-position, $Z_1$ is connected to the carbon at the 3-position.

11. A metal chelated dyestuff for inkjet recording as defined in claim 10, wherein in the general formula (6), $Z_1$ connected to the carbon at the 3-position is sulfo group or sulfamoyl group which may be substituted.

12. A metal chelated dyestuff for inkjet recording as defined in claim 4, wherein in the general formula (1), the heterocyclic ring containing $X_1$ is represented by the following general formula (7):

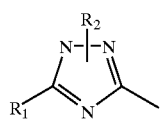

(7)

wherein $R_1$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group, hydroxyl group, acyl group which may be substituted, cyano group, amino group which may be substituted, acylamino group which may be substituted, nitro group, halogen atom, sulfo group, mercapto group, alkylthio group which may be substituted, alkylsulfoxy group which may be substituted, alkylsulfonyl group which may be substituted or thiocyanato group; $R_2$ represents hydrogen atom, alkyl group which may be substituted, aryl group which may be substituted or allyl group which may be substituted; and $R_1$ and $R_2$ may form a condensed ring together with a triazole ring.

13. A metal chelated dyestuff for inkjet recording as defined in claim 9, wherein in the general formula (1), the heterocyclic ring containing $X_1$ is represented by the following general formula (7):

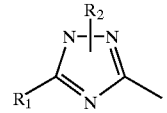

(7)

wherein $R_1$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, carbamoyl group, hydroxyl group, acyl group which may be substituted, cyano group, amino group which may be substituted, acylamino group which may be substituted, nitro group, halogen atom, sulfo group, mercapto group, alkylthio group which may be substituted, alkylsulfoxy group which may be substituted, alkylsulfonyl group which may be substituted or thiocyanato group; $R_2$ represents hydrogen atom, alkyl group which may be substituted, aryl group which may be substituted or allyl group which may be substituted; and $R_1$ and $R_2$ may form a condensed ring together with a triazole ring.

14. A metal chelated dyestuff for inkjet recording as defined in claim 4, wherein in the general formula (1), the heterocyclic ring containing $X_1$ is represented by the following general formula (8):

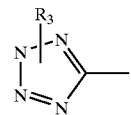

(8)

wherein $R_3$ represents hydrogen atom, alkyl group which may be substituted, aryl group which may be substituted, aralkyl group which may be substituted, alkoxycarbonyl group which may be substituted, aryloxycarbonyl group which may be substituted, carboxyl group, carbamoyl group, hydroxyl group, cyano group or sulfo group.

15. A metal chelated dyestuff for inkjet recording as defined in claim 4, wherein in the general formula (1), the heterocyclic ring containing $X_1$ is represented by the following general formula (9):

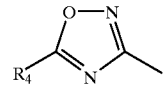

(9)

wherein $R_4$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

16. A metal chelated dyestuff for inkjet recording as defined in claim 4, wherein in the general formula (1), the heterocyclic ring containing $X_1$ is represented by the following general formula (10):

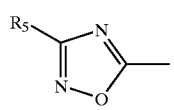

(10)

wherein $R_5$ represents hydrogen atom, alkyl group which may be substituted, aryl group which may be substituted, aralkyl group which maybe substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

17. A metal chelated dyestuff for inkjet recording as defined in claim 4, wherein in the general formula (1), the heterocyclic ring containing $X_1$ is represented by the following general formula (11):

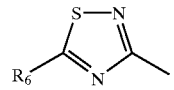

(11)

wherein $R_6$ represents hydrogen atom, alkyl group which may be substituted, aryl group which may be substituted, aralkyl group which may be substituted, alkoxy group which may be substituted, aryloxy group which may be substituted, acyloxy group which may be substituted, alkoxycarbonyl group which may be substituted, aryloxycarbonyl group which may be substituted, carboxyl group, hydroxyl group, acyl group which may be substituted, cyano group, acylamino group which may be substituted, nitro group, halogen atom, sulfo group, alkylthio group which may be substituted or arylthio group which may be substituted.

18. A metal chelated dyestuff for inkjet recording as defined in claim 1 or 2, wherein the water soluble azo metal chelated dyestuff is a water soluble azo metal chelated dyestuff formed by the azo-based compound and a metal element selected from the group consisting of nickel, copper and cobalt.

19. A metal chelated dyestuff for inkjet recording as defined in claim 18, wherein the water soluble azo metal chelated dyestuff is a water soluble azo metal chelated dyestuff formed by the azo-based compound and copper element.

20. A metal chelated dyestuff for inkjet recording as defined in claim 18, wherein the water soluble azo metal chelated dyestuff is a water soluble azo metal chelated dyestuff formed by the azo-based compound and nickel element.

21. An aqueous inkjet recording liquid comprising an aqueous medium and one or more metal chelated dyestuffs for inkjet recording as defined in claim 1 or 2.

22. A method comprising inkjet recording with an aqueous inkjet recording liquid as defined in claim 21.

* * * * *

UNITED STATES PATENT AND TRADEMARK OFFICE
CERTIFICATE OF CORRECTION

PATENT NO. : 6,827,770 B2
DATED : December 7, 2004
INVENTOR(S) : Chino et al.

It is certified that error appears in the above-identified patent and that said Letters Patent is hereby corrected as shown below:

<u>Title page,</u>
Items [45] and [*] Notice, should read:

-- [45] **Date of Patent: *Dec. 7, 2004**

[*]  Notice: Subject to any disclaimer, the term of this patent is extended or adjusted under 35 U.S.C. 254(b) by 283 days.

This Patent is subject to a terminal disclaimer. --.

Signed and Sealed this

Tenth Day of January, 2006

JON W. DUDAS
*Director of the United States Patent and Trademark Office*